US011679331B2

(12) United States Patent
Li

(10) Patent No.: US 11,679,331 B2
(45) Date of Patent: Jun. 20, 2023

(54) OBJECT JUMP CONTROL METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Haitao Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/357,920

(22) Filed: Jun. 24, 2021

(65) Prior Publication Data
US 2021/0316222 A1 Oct. 14, 2021

Related U.S. Application Data

(63) Continuation of application No. PCT/CN2020/091031, filed on May 19, 2020.

(30) Foreign Application Priority Data

May 23, 2019 (CN) .......................... 201910436562.3

(51) Int. Cl.
A63F 13/573 (2014.01)
(52) U.S. Cl.
CPC ................................. A63F 13/573 (2014.09)
(58) Field of Classification Search
CPC .................................................... A63F 13/573
See application file for complete search history.

(56) References Cited

U.S. PATENT DOCUMENTS

2002/0115483 A1 8/2002 Fujiwara et al.
2003/0022715 A1 1/2003 Okubo
2008/0119285 A1 5/2008 Yamashita
(Continued)

FOREIGN PATENT DOCUMENTS

CN 1990074 A 7/2007
CN 102117179 A 7/2011
(Continued)

OTHER PUBLICATIONS

"Donkey Kong Country—Full Game 101% Walkthrough, Oct. 22, 2017," Youtube, https://www.youtube.com/watch?v=bXHDSA35_2k&t=345s (Year: 2017).*
(Continued)

Primary Examiner — Reginald A Renwick
(74) Attorney, Agent, or Firm — Anova Law Group, PLLC

(57) ABSTRACT

The present disclosure provides a virtual object jump control method performed by a computer device. The method includes determining, in a process that a first virtual object in a virtual scene moves to a destination, a target landing point of the first virtual object according to a position of the destination when a current position of the first virtual object meets a jump condition; determining, according to the current position and the target landing point, a jump trajectory of the first virtual object jumping from the current position to the target landing point; and controlling the first virtual object to jump from the current position to the target landing point according to the jump trajectory.

19 Claims, 8 Drawing Sheets

(56) References Cited

U.S. PATENT DOCUMENTS

| | | | |
|---|---|---|---|
| 2014/0357359 A1 | 12/2014 | Kando et al. | |
| 2017/0216729 A1 | 8/2017 | Onishi et al. | |
| 2018/0050265 A1 | 2/2018 | Wada et al. | |
| 2018/0056183 A1* | 3/2018 | Tezuka | A63F 13/56 |
| 2018/0345138 A1* | 12/2018 | Gohara | A63F 13/285 |
| 2021/0016176 A1 | 1/2021 | Yu et al. | |
| 2021/0316222 A1 | 10/2021 | Li | |

FOREIGN PATENT DOCUMENTS

| | | |
|---|---|---|
| CN | 102693362 A | 9/2012 |
| CN | 103083909 A | 5/2013 |
| CN | 107744665 A | 3/2018 |
| CN | 108434731 A | 8/2018 |
| CN | 108579087 A | 9/2018 |
| CN | 109568949 A | 4/2019 |
| CN | 110193198 A | 9/2019 |
| EP | 1002562 B1 | 7/2008 |
| JP | 2000153062 A | 6/2000 |
| JP | 2002200333 A | 7/2002 |
| JP | 2003044878 A | 2/2003 |
| JP | 2005237605 A | 9/2005 |
| JP | 2008125550 A | 6/2008 |
| JP | 2014233536 A | 12/2014 |
| WO | 2018042466 A1 | 3/2018 |

OTHER PUBLICATIONS

The State Intellectual Property Office of the People's Republic of China (SIPO) Office Action 1 for for 201910436562.3 dated Apr. 6, 2022 11 Pages (including translation).
Anonymous, "PlayerUnknown's Battlegrounds: The player jumped directly from the container and shot all the bullets from the rifle!," Tencent Video, Mar. 9, 2019, 00:00-00:34, Retrieved from the Internet:URL: https://v.qq.com/x/page/i0846g8yfh9.html. 4 pages.
RUAN8 Editor, "The method of jumping container in "PUBG Mobile"," Ruan8.com, Feb. 23, 2018, Retrieved from the Internet:URL: https://www.ruan8.com/news/2622.html. 5 pages.
The World Intellectual Property Organization (WIPO) International Search Report for PCT/CN2020/091031 dated Aug. 18, 2020 6 Pages (including translation).
The European Patent Office (EPO) The Extended European Search Report for 20810259.0 dated Jul. 13, 2022 7 pages.
Japan Patent Office (JPO) The Office Action For JP Application No. 2021-538385 dated Sep. 6, 2022 12 Pages (Translation Included).
Kodai Kurimoto., "Countless zombies jump over obstacles and "attack like a herd" MMORPG Eternal City 3", Aug. 12, 2015, http://web.archive.org/web/20150814121005/https://www.inside-games.jp/article/2015/08/12/90225.html.
China National Intellectual Property Administration (CNIPA) Office Action 2 for 201910436562.3 dated Jun. 30, 2022 10 pages (including translation).
Wang Xiaobai's Explanation, "Stimulate the battlefield: 398 skydives, met people who jumped from the building, and also gained a "God" gun!" haokan.baidu.com, Aug. 3, 2018, Retrieved from the Internet:URL: https://haokan.baidu.com/v?vid=9747494679073794632 &pd. 3 pages.
Soft Editor, "The method of jumping containers in "PUBG Mobile"," ruan8.com, Feb. 23, 2018, Retrieved from the Internet:URL: https://www.ruan8.com/news/2622.html [retrieved on Jul. 2, 2022] 5 pages (including translation).
The Japan Patent Office (JPO) Notification of Reasons for Refusal for Application No. 2021-538385 and Translation dated Feb. 7, 2023 4 Pages.
IP Australia Examination report No. 2 for Application No. 2020280597 dated May 23, 2019 4 pages.

* cited by examiner

OBJECT JUMP CONTROL METHOD AND APPARATUS, COMPUTER DEVICE, AND STORAGE MEDIUM

RELATED APPLICATIONS

This application is a continuation application of PCT Application No. PCT/CN2020/091031, entitled "OBJECT JUMPING CONTROL METHOD AND APPARATUS, AND COMPUTER DEVICE AND STORAGE MEDIUM" and filed on May 19, 2020, which in turn claims priority to Chinese Patent Application No. 201910436562.3 filed with the China National Intellectual Property Administration on May 23, 2019, and entitled "OBJECT JUMP CONTROL METHOD AND APPARATUS, COMPUTER DEVICE, AND STORAGE MEDIUM." Both applications are incorporated herein by reference in their entirety.

FIELD OF THE TECHNOLOGY

Embodiments of this application relate to the field of network technologies, and in particular, to an object jump control method and apparatus, a computer device, and a storage medium.

BACKGROUND OF THE DISCLOSURE

Currently, many games are provided with adversarial virtual objects fighting against virtual user object s. For example, in a game scene, an adversarial virtual object in the form of a zombie may move close to a virtual user object, to attack the virtual user object. When the adversarial virtual object moves, if the adversarial virtual object moves to a non-walkable region, a server may control the adversarial virtual object to jump, for example, from one end of the non-walkable region to another end thereof.

SUMMARY

Embodiments of this application provide an object jump control method and apparatus, a computer device, and a storage medium.

One aspect of the present disclosure provides a virtual object jump control method performed by a computer device. The method includes determining, in a process that a first virtual object in a virtual scene moves to a destination, a target landing point of the first virtual object according to a position of the destination when a current position of the first virtual object meets a jump condition; determining, according to the current position and the target landing point, a jump trajectory of the first virtual object jumping from the current position to the target landing point; and controlling the first virtual object to jump from the current position to the target landing point according to the jump trajectory.

According to another aspect of the present disclosure, a computer device is provided, including a memory and a processor, the memory storing computer-readable instructions, the computer-readable instructions, when executed by the processor, causing the processor to perform: determining, in a process that a first virtual object in a virtual scene moves to a destination, a target landing point of the first virtual object according to a position of the destination when a current position of the first virtual object meets a jump condition; determining, according to the current position and the target landing point, a jump trajectory of the first virtual object jumping from the current position to the target landing point; and controlling the first virtual object to jump from the current position to the target landing point according to the jump trajectory.

According to another aspect of the present disclosure, one or more non-transitory storage media storing computer-readable instructions are provided, the computer-readable instructions, when executed by one or more processors, causing the one or more processors to perform: determining, in a process that a first virtual object in a virtual scene moves to a destination, a target landing point of the first virtual object according to a position of the destination when a current position of the first virtual object meets a jump condition; determining, according to the current position and the target landing point, a jump trajectory of the first virtual object jumping from the current position to the target landing point; and controlling the first virtual object to jump from the current position to the target landing point according to the jump trajectory.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

An object jump control process may include: a server configures a link bridge manually in each non-walkable region based on jump points selected by a user, where the link bridge includes two jump points selected by the user. The server may control the adversarial virtual object to jump from one jump point to the other jump point. A link bridge needs to be manually configured in each non-walkable region. However, a game scene generally includes a lot of non-walkable regions. Therefore, a lot of link bridges need to be manually configured, and a lot of internal memory of a server is occupied. As a result, a lot of resources, such as labor power and internal memory, are consumed.

Embodiments of this application relate to a video game scene, where the video game scene includes a virtual scene and a virtual object. The virtual object refers to an object that can complete various actions in the virtual scene, for example, at least one action of jumping, walking, or running. The virtual object may be a virtual user object for representing a user; or the virtual object may be used for representing an adversarial virtual object pre-configured in a game and fighting against a virtual user object. For example, an adversarial virtual object in the form of a zombie may attack a virtual user object. The virtual object may alternatively be used for representing a user-associated virtual object having an association relationship with a virtual user object in a virtual scene, for example, a prop or a virtual pet owned by or a vehicle ridden by the virtual user object in the virtual scene. The virtual object may be in any form, for example, a person, an animal, or any virtualized shape, such as an adversarial virtual object in the form of a zombie.

Figure 1:
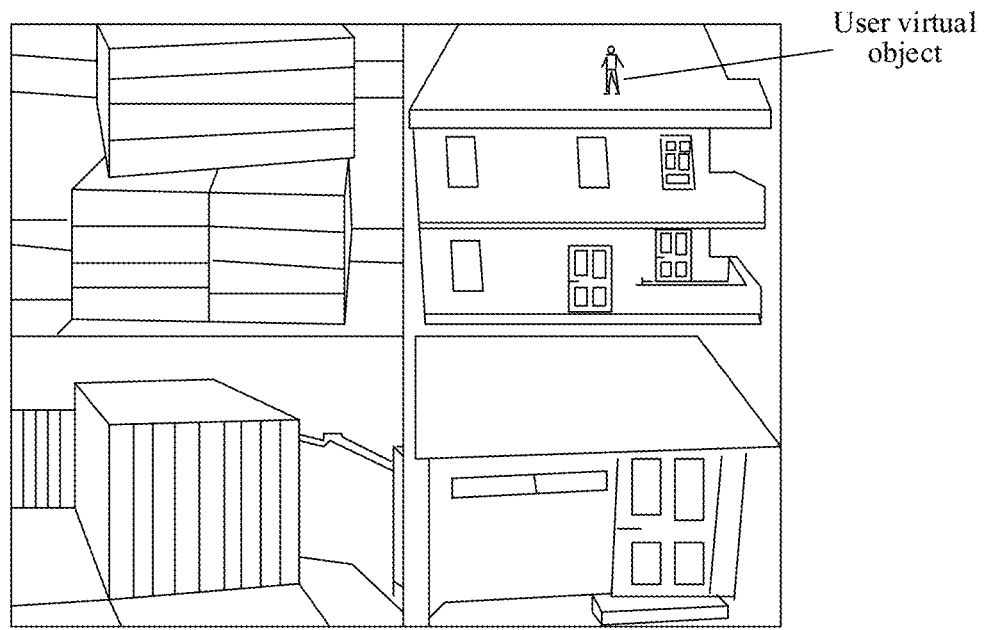
FIG. 1 is a schematic diagram of a scene of an object jump control method according to an embodiment of this application.
Figure 2:
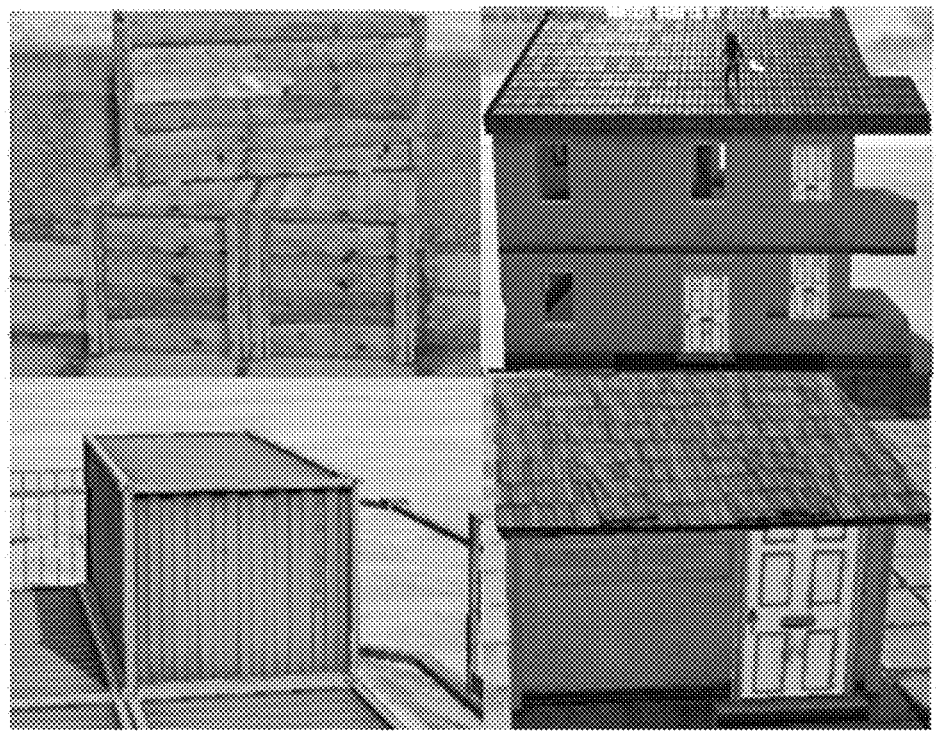
FIG. 2 is a schematic diagram of a scene interface of an object jump control method according to an embodiment of this application.

In one embodiment, the adversarial virtual object may move toward a direction of the virtual user object, the adversarial virtual object moves close to the virtual user object, and attacks the virtual user object. A user may also control the virtual user object to move, to evade from attack of the adversarial virtual object, or the user may control the virtual user object to fight against the adversarial virtual object, for example, control the virtual user object to fight against the adversarial virtual object by using a virtual prop. In a process that the adversarial virtual object moves to the virtual user object, the adversarial virtual object may also perform a jump action to jump toward the direction of the virtual user object. For example, as shown in FIG. 1, if the virtual user object is located on a roof of a house and the adversarial virtual object is located on a ground, the adversarial virtual object may jump to the roof. As shown in FIG. 2, FIG. 2 is a schematic diagram of an actual scene interface of FIG. 1, and a virtual scene corresponding to FIG. 1 may be known more clearly from FIG. 2.

In another embodiment, the user may also select a destination in the virtual scene in advance, and the virtual user object may move toward a direction of the destination. In a moving process, the virtual user object may also perform a jump action. For example, if the virtual user object encounters an obstacle such as a river in a process of running along a shortest path, the virtual user object may also jump to the other side of the river.

In another embodiment, the user-associated virtual object may also move along with the virtual user object in real time, and in a real time following movement process, the user-associated virtual object may also perform a jump action.

For example, when the virtual user object moves forward quickly on virtual stairs, a virtual pet dog of the virtual user object may also jump to a stair on which the virtual user object is currently located.

The virtual scene may be a simulated scene of a real world, or may be a semi-simulated semi-fictional scene, or may be an entirely fictional scene. For example, the virtual scene may include at least one of the sky, the land, and the ocean, and the land may include at least one environment element such as a desert or a city. The virtual object may move in the virtual scene. By using a shooting game as an example, the virtual object falls freely, glides, opens a parachute to fall, or the like in the sky of the virtual scene, or runs, jumps, crawls, bends forward, or the like on the land, or swims, floats, dives, or the like in the ocean. Certainly, the virtual object may alternatively drive a vehicle to move in the virtual scene. Herein, the foregoing scene is merely used as an example for description, and this is not specifically limited in the embodiments of this application.

In the embodiments of this application, a computer device may obtain a game configuration file of a game application in advance, and the game configuration file may include an application program, page display data, virtual scene data, or the like of the video game, so that the computer device can invoke the game configuration file while starting the video game, to render and display a page of the video game. The game configuration file may further include action logic of the virtual object, and the computer device may control the jump action of the virtual object based on the action logic. The computer device may be a terminal, and the terminal controls the virtual object to jump based on the action logic of the virtual object, determines game data corresponding to the jump process based on the jump process, and renders and displays the game data in real time. The game data may include virtual scene data, action data of the virtual object in the virtual scene, and the like. The computer device may alternatively be a server. The server may be a backend server of the game application, and the server may transmit jump information of the virtual object to a terminal in real time based on the action logic of the virtual object, for example, at least one of a landing point, a jump speed, or a jump trajectory during jumping, so that the terminal determines game data corresponding to the jump process based on the jump information and renders and displays the game data.

The terminal may be any terminal on which the application program is installed. This is not specifically limited in the embodiments of this application. For example, the terminal may be any device such as a mobile phone terminal, a portable android device (PAD) terminal or a computer terminal on which the video game is installed.

Figure 3:
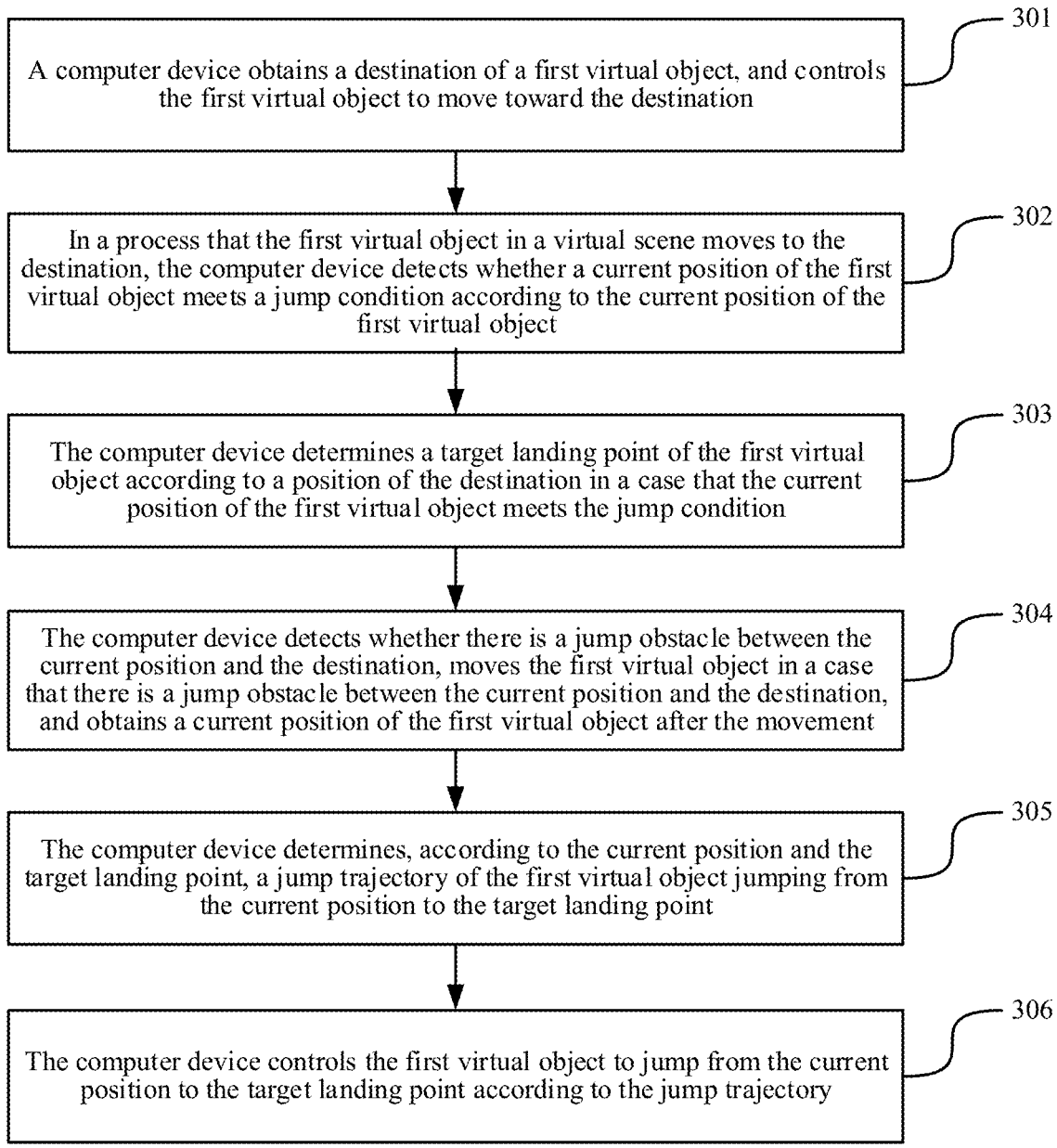
FIG. 3 is a flowchart of an object jump control method according to an embodiment of this application.

FIG. 3 is a flowchart of an operation control method according to an embodiment of this application. An entity executing this embodiment of the present disclosure is a computer device. Referring to FIG. 3, the method includes:

301. A computer device obtains a destination of a first virtual object, and controls the first virtual object to move toward the destination.

In the embodiments of this application, the first virtual object may be a virtual user object, an adversarial virtual object fighting against a virtual user object, a user-associated virtual object of a virtual user object, a subsidiary virtual object of an adversarial virtual object, or the like. The destination refers to a current position of a target virtual object in the virtual scene, or a selected position in the virtual scene. The target virtual object may also be any one of a virtual user object, an adversarial virtual object fighting against a virtual user object, a user-associated virtual object of a virtual user object, a subsidiary virtual object of an adversarial virtual object, and the like.

In some implementation scenes, the first virtual object may move along with the target virtual object. In one embodiment, an adversarial virtual object pursues and attacks a virtual user object, for example, a zombie virtual object pursues and attacks a virtual user object within a target scene range. In another example, a user-associated virtual object moves along with a virtual user object in real time, for example, a virtual pet moves along with a virtual user object in real time. In another example, a subsidiary virtual object of an adversarial virtual object moves along with the adversarial virtual object in real time, for example, a small zombie virtual object moves along with a large zombie virtual object in real time, or a virtual soldier moves along with a virtual captain. In another example, a task collaboration object of the first virtual object may also follow the first virtual object in real time. The foregoing examples are provided in the embodiments of this application for description, and specific representation forms of the target virtual object and the first virtual object are not specifically limited in the embodiments of this application.

In one embodiment, the target virtual object may include, but is not limited to, a second virtual object within a target scene range of the first virtual object, a third virtual object having an adversarial association relationship with the first virtual object, or a task collaboration object of the first virtual object. In this step, the computer device may determine the destination of the first virtual object based on any one of the following four methods.

The first method: when a second virtual object is included in the target scene range corresponding to the first virtual object, the computer device determines the second virtual object as the target virtual object, obtains a current position of the target virtual object, and determines the current position of the target virtual object as the destination.

In one embodiment, the target virtual object may be a virtual user object, and the first virtual object may be an adversarial virtual object of the virtual user object. The computer device may configure one or more adversarial virtual objects within a specific scene range, each adversarial virtual object corresponds to one target scene range, and when the computer device detects that the virtual user object is included in the target scene range corresponding to the adversarial virtual object, the computer device uses a current position of the virtual user object as the destination, and controls the adversarial virtual object to pursue and attack the virtual user object In another example, the target virtual object and the first virtual object may be virtual user objects. For example, the target virtual object and the first virtual object may be in the same team; when an auto follow mode of the first virtual object is in an enabled state and the target scene range of the first virtual object includes a teammate virtual object that is in the same team, the computer device uses a current position of the teammate virtual object as the destination, and controls the first virtual object to move along with the teammate virtual object in real time.

The second method: the computer device determines a third virtual object having an adversarial association relationship with the first virtual object as the target virtual object, obtains a current position of the target virtual object, and determines the current position of the target virtual object as the destination.

In one embodiment, the target virtual object may be a virtual user object, and the first virtual object may be an adversarial virtual object of the virtual user object. The computer device may store the adversarial association relationship between the first virtual object and the third virtual object. For example, if an adversarial virtual object A pursues and attacks a virtual user object B in real time, a destination of the adversarial virtual object A is a current position of the virtual user object B.

The third method: the computer device determines a task collaboration object of the first virtual object as the target virtual object, obtains a current position of the target virtual object, and determines the current position of the target virtual object as the destination.

In one embodiment, the first virtual object may be a virtual user object or an adversarial virtual object, and the task collaboration object of the first virtual object may be a virtual object having a virtual dependency relationship or a teammate virtual object that is in a same team with the first virtual object, for example, a virtual pet, a virtual soldier object of a virtual captain, or a small zombie virtual object. For example, the virtual pet of the virtual user object may move along with the virtual user object in real time.

The fourth method: the computer device obtains a selected position in the virtual scene, and determines a current position of the target virtual object as the destination.

In one embodiment, the destination may be a scene position that is selected in advance. For example, a destination such as a mountaintop or the front of a door of an armory is selected in advance, and a plurality of virtual objects seize the destination quickly.

The computer device may use a current position of the target virtual object as the destination, or may use a position selected by a user as the destination, and control the first virtual object to move, where the target virtual object may have an adversarial relationship or a task collaboration relationship with the first virtual object, thereby enriching the applicability of the object jump control method.

302. In a process that the first virtual object in a virtual scene moves to the destination, the computer device detects whether a current position of the first virtual object meets a jump condition according to the current position of the first virtual object.

In the embodiments of this application, the computer device may obtain a current position of the first virtual object, and detect whether the current position of the first virtual object meets a jump condition according to the current position and the destination.

In one embodiment, the jump condition may be: there is no walking path between the current position and the destination. The walking path refers to a path for walking movement. In this step, the computer device may detect whether there is a walking path between the current position and the destination according to the current position, and when there is no walking path between the current position and the destination, the computer device determines that the current position of the first virtual object meets the jump condition. In one embodiment, the computer device may use a navigation mesh to represent positions of scene objects and virtual objects in the virtual scene, such as positions of houses, rivers, containers, or vehicles. The navigation mesh includes a plurality of polygonal cells, each polygonal cell is used for representing a position node in the virtual scene, and the computer device may further determine a walking path between the current position and the destination based on the navigation mesh. In this step, the computer device may find a walking path from a position node in which the current position is located to a position node in which the destination is located by using a target pathfinding algorithm according to the position node in which the current position is located, and determine that the current position meets the jump condition if no walking path from the position node in which the current position is located to the position node in which the destination is located is found; otherwise, the computer device determines that the current position does not meet the jump condition.

In one embodiment, the target pathfinding algorithm may be set as required, which is not limited in the embodiments of this application. For example, the target pathfinding algorithm may be an A* (A-Star, heuristic searching) algorithm. The navigation mesh may be Nav Mesh. A plurality of adjacent polygons surround each polygonal cell and adjacent polygonal cells are communicated. A virtual object may walk from a polygonal cell to an adjacent polygonal cell. The adjacent polygonal cell refers to a polygonal cell that is near a polygonal cell and that has a common side with the polygonal cell. A walking path finding process may include: the computer device uses a polygonal cell in which the current position is located as a starting point, and uses a polygonal cell in which the destination is located as an endpoint; the computer device finds a plurality of intermediate nodes from the starting point to the endpoint by using the A* algorithm to find a path, and when no path is found, it indicates that the two points cannot reach each other.

When the computer device finds an intermediate node during pathfinding, the computer device may continue to find a next intermediate node based on the current intermediate node and the endpoint until the endpoint is reached. The computer device does not need to store a plurality of intermediate nodes that are found, and only needs to determine whether there is a walking path between the current position and the destination. It is unnecessary to obtain the intermediate nodes included in a specific walking path. Therefore, storage time is saved, and a pathfinding result can be determined quickly, thereby improving processing efficiency.

In another embodiment, the jump condition may alternatively be: there is an obstacle in front of the current position in a direction of a shortest path between the current position and the destination. In this step, the computer device may determine a shortest path between the current position and the destination, and the shortest path may be a straight-line direction from the current position to the destination. In a process that the first virtual object moves toward the destination, the computer device may control the first virtual object to move along the shortest path. The computer device may detect whether there is an obstacle within a first target range in front of the current position in the direction of the shortest path. When there is an obstacle within the first target range in front of the current position, the computer device determines that the current position meets the jump condition (the target range in this step is referred to as the first target range, to be distinguished from a second target range in step 303). The first target range may be set as required, for example, the first target range refers to a range within 1 meter or 2 meters in front of the first virtual object. The obstacle refers to a physical object that blocks the first virtual object from walking, for example, at least one of a river, a stone, or a railing.

Figure 4:
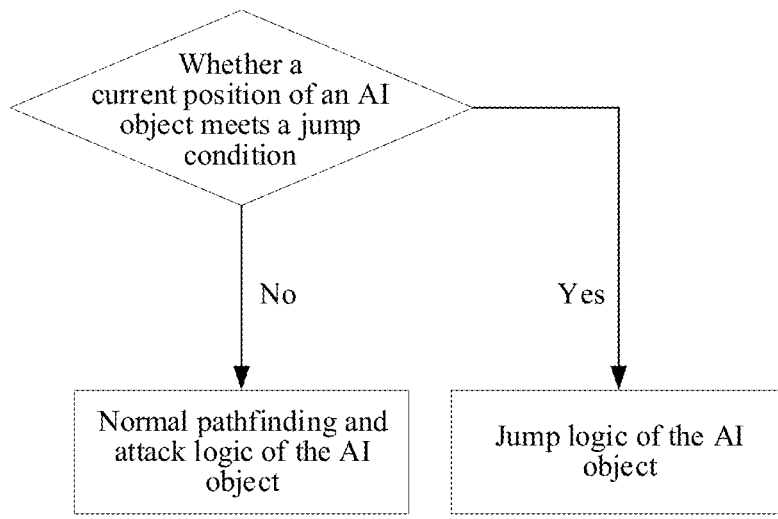
FIG. 4 is a flowchart of object state detection according to an embodiment of this application.

In the embodiments of this application, the computer device may perform the process of step 302 periodically, and perform a process of subsequent steps 303 to 306, that is, an object jump process, when the current position meets the jump condition. In one embodiment, the first virtual object may be an artificial intelligence (AI) object that is pre-configured in a game. The AI object may be used for fighting against a virtual user object. For example, the AI object is an adversarial virtual object in the form of a zombie. The AI object may perform a jump process based on a pre-configured action tree, where the action tree refers to a tree structure formed by action nodes of the AI object and used for indicating action logic of the AT object, and execution of an action node is affected and controlled by a parent node. This step may alternatively be: when the first virtual object is an AI object, the computer device may add a first node to an action tree of the first virtual object, where the first node is used for instructing to perform the detection process of step 302 according to a target cycle, thereby updating a detection state of the current position periodically. The computer device may further add a second node to the action tree, where the second node is used for instructing to perform a process of step 303 when the current position meets the jump condition. As shown in FIG. 4, when a current position of the AI object meets the jump condition, for example, the AI object cannot walk to the virtual user object, the jump process of subsequent steps 303 to 306 is performed; and when the current position of the AI object does not meet the jump condition, normal pathfinding and attack logic of the AI object is performed, that is, the AI object is controlled to walk to the virtual user object and attack the virtual user object.

Figure 5:
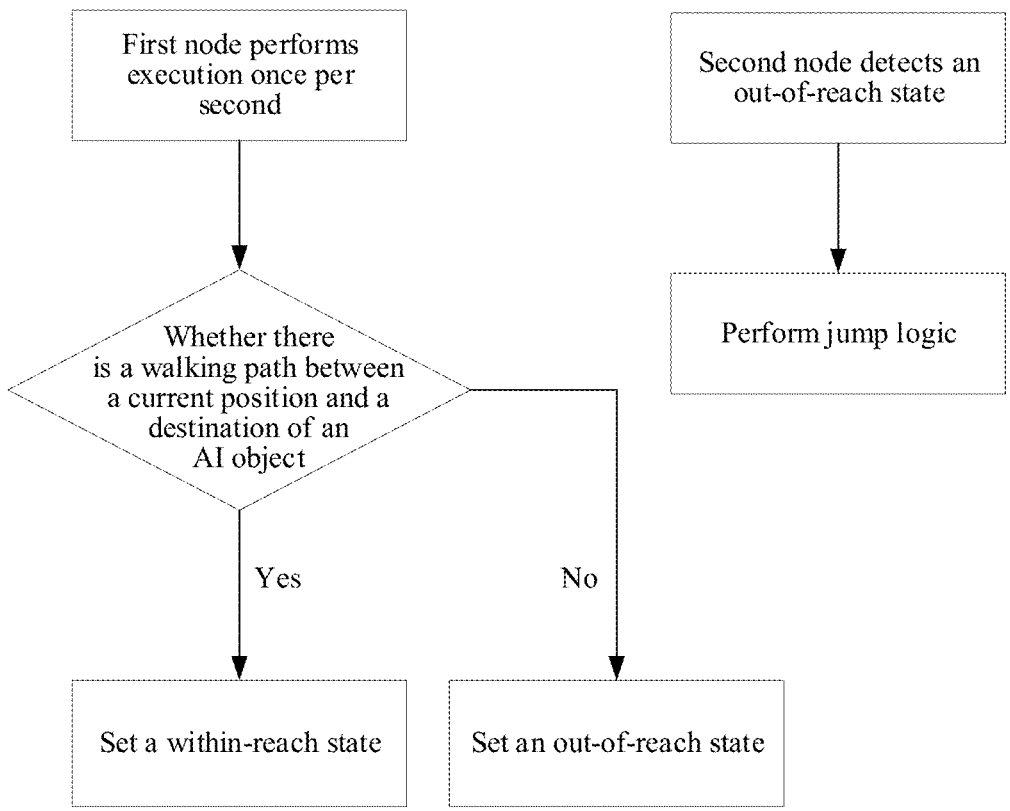
FIG. 5 is a flowchart of object state detection according to an embodiment of this application.

In one embodiment, the first node may be a service node, and the second node may be a task node, for example, a decorator node. As shown in FIG. 5, description is made by using a service node as an example. The service node may be set to perform the process of step 302 once per second, to determine whether the current position meets the jump condition, for example, whether the AI object can walk to the virtual user object. When the AI object cannot walk to the virtual user object, the computer device sets a state of the AI object to an out-of-reach state; otherwise, the computer device sets the state to a within-reach state. When it is detected that the state of the AI object is the out-of-reach state, the jump process of subsequent steps 303 to 306 is performed.

303. The computer device determines a target landing point of the first virtual object according to a position of the destination when the current position of the first virtual object meets the jump condition.

The target landing point refers to a position the first virtual object reaches after performing a jump action. In the embodiments of this application, the computer device may select one point within a walking region of the destination as the target landing point. The computer device may alternatively select a point that is relatively close to the destination as the target landing point, or the computer device may directly use the destination as the target landing point. Correspondingly, this step may include any one of the following four implementations.

The first implementation: when the current position meets the jump condition, the computer device determines a target landing point within a walking region based on the walking region of the destination.

There is a walking path between any position in the walking region and the destination, that is, a first virtual object on any position in the walking region can walk to the destination. In this step, the destination may be the current position of the target virtual object in the virtual scene.

In the embodiments of this application, the virtual scene includes a plurality of walking regions, and the computer device may determine a walking region including the destination as a walking region of the destination according to the position of the destination. In one embodiment, the computer device may alternatively select a relatively small region in the walking region in which the destination is located as a walking region of the destination. The process may include: the computer device determines a walking region within a target range including the destination as a walking region of the destination according to the position of the destination. For example, the computer device may use the destination as a central point to obtain a walking region of which a distance to the destination does not exceed a first target distance.

The computer device obtains a walking region in which the destination is located according to the position of the destination, and the computer device may continue to obtain a circular region, which uses the destination as a central point and the first target distance as a radius, as a walking region of the destination. For example, a circular walking region with a radius of 5 meters is obtained.

In one embodiment, the computer device may select the target landing point based on a jump speed of the first virtual object, that is, a process of the following step a. In another embodiment, the computer device may alternatively select the target landing point based on user selection, that is, a process of the following step b.

Step a. The computer device obtains, according to a maximum jump speed of the first virtual object, a target landing point corresponding to the maximum jump speed in the walking region.

In the embodiments of this application, a jump speed range of the first virtual object is limited, and the computer device may obtain a point that causes the first virtual object to jump farthest as the target landing point according to a maximum jump speed of the first virtual object. In one embodiment, the computer device may obtain the maximum jump speed of the first virtual object, and determine a maximum jump distance of the first virtual object according to the maximum jump speed. The computer device obtains a target landing point corresponding to the maximum jump distance in the walking region according to the maximum jump distance and the current position.

In one embodiment, when the destination and the current position of the first virtual object are located in the same horizontal plane, the computer device may determine a farthest jump distance of the first virtual object in the horizontal plane according to the maximum jump speed of the first virtual object. The computer device determines a target landing point corresponding to the farthest jump distance in the walking region of the first virtual object according to the farthest jump distance.

In another embodiment, when the destination and the current position of the first virtual object are located at different levels, the computer device may determine farthest jump distances of the first virtual object in a horizontal plane and a vertical plane respectively according to the maximum jump speed of the first virtual object. The computer device determines a target landing point corresponding to the farthest jump distance in the walking region of the first virtual object according to the farthest jump distances of the first virtual object in the horizontal plane and the vertical plane.

Step b. The computer device obtains a selected position in the walking region, and determines the selected position as the target landing point.

In this step, the first virtual object may be a virtual user object, and the destination may be a current position of the target virtual object, or a selected position in the virtual scene.

When the computer device is a terminal, the computer device may display the walking region of the destination in an application interface, and the user may select a target landing point of the first virtual object in the walking region. The computer device obtains the target landing point selected by the user. In one embodiment, the computer device may further transmit the target landing point selected by the user to a server after obtaining the target landing point selected by the user.

When the computer device is a server, a terminal in which the user is located may display the walking region of the destination, and the terminal transmits the target landing point selected by the user to the computer device.

The jump speed of the first virtual object is limited. Therefore, a jump distance of the first virtual object is limited. The computer device may select, in the walking region, a point within the reach of the maximum jump speed as the target landing point according to the maximum jump speed of the first virtual object, so that the first virtual object can jump as far as possible through one jump, thereby preventing the virtual object from running due to a relatively short jump distance. If the first virtual object is a virtual user object, the virtual user object may also be prevented from losing too many hit points, thereby maximizing the virtualization ability of the first virtual object in the game. In addition, the computer device may further provide a selection entry for the user to use a point selected by the user as the target landing point, thereby better meeting user requirements and improving user experience.

The second method: when the current position meets the jump condition, the computer device determines a position that is closest to the destination in the virtual scene as the target landing point.

In this step, the destination may be the current position of the target virtual object in the virtual scene. The computer device may obtain a plurality of adjacent positions of the destination by using the destination as a center according to the position of the destination. The computer device obtains a distance between each adjacent position and the destination, and selects, according to the plurality of distances, a position that is closest to the destination from the plurality of adjacent positions as the target landing point.

In one embodiment, if the computer device uses a navigation mesh to represent positions of objects in a virtual scene, the computer device may obtain, according to a polygonal cell in which the destination is located, a plurality of adjacent polygonal cells of the polygonal cell in which the destination is located, calculate a distance between each adjacent polygonal cell and the polygonal cell in which the destination is located sequentially, to determine an adjacent polygonal cell that is closest to the polygonal cell in which the destination is located, and use a position node corresponding to the adjacent polygonal cell as the target landing point.

The third method: when the current position meets the jump condition, the computer device determines an adjacent position of the destination in the virtual scene as the target landing point.

In this step, the destination may be the current position of the target virtual object in the virtual scene. In one embodiment, if the computer device uses a navigation mesh to represent positions of objects in a virtual scene, the computer device may obtain, according to a polygonal cell in which the destination is located, any adjacent polygonal cell of the polygonal cell in which the destination is located, and use a position node corresponding to the any adjacent polygonal cell as the target landing point.

The fourth method: when the current position meets the jump condition, the computer device determines the destination as the target landing point.

In this step, the destination may be a selected position in the virtual scene. The computer device may further obtain a polygonal cell in which the destination is located in a navigation mesh, and use a position node corresponding to the polygonal cell in which the destination is located as the target landing point of the first virtual object. The first virtual object may directly jump to the destination.

When the destination is the current position of the target virtual object, the computer device may determine the target landing point based on the position, an adjacent position, or a closest position of the destination in the walking region based on the foregoing first method to the third method, thereby preventing the first virtual object and the target virtual object from colliding with each other. When the destination is a position that is selected in advance, the computer device may directly use the destination as the target landing point according to the foregoing fourth method, thereby saving calculation time and improving the applicability of the object jump control method.

304. The computer device detects whether there is a jump obstacle between the current position and the destination, moves the first virtual object when there is a jump obstacle between the current position and the destination, and obtains a current position of the first virtual object after the movement.

A jump obstacle refers to an object that the first virtual object encounters in the air after jumping and before reaching the target landing point. When there is no jump obstacle between the current position and the destination, the computer device directly performs step 305. In this step, the computer device may detect whether there is a jump obstacle within a second target range of the current position based on a distance between the current position and the destination. When there is a jump obstacle within the second target range, the computer device controls the first virtual object to move by a target movement distance in a direction away from the jump obstacle, that is, controls the first virtual object to retreat by the target movement distance. The computer device obtains a current position after the movement.

In one embodiment, the computer device may further detect a height of the jump obstacle within the second target range, and control the first virtual object to move by a target movement distance in a direction away from the jump obstacle when the height of the jump obstacle exceeds a target height. The second target range may be a range in which a distance to the current position does not exceed a second target distance in a direction toward the destination. The second target distance, the target height, and the target movement distance may be set based on requirements, which are not specifically limited in the embodiments of this application. For example, the second target distance may be 2 meters or 3 meters. The target height may be 10 meters or 8 meters. The target movement distance may be 3 meters or 1 meter. In one embodiment, the computer device may store a correspondence between a plurality of heights of the jump obstacle and a plurality of movement distances. The computer device obtains a height of a jump obstacle within the second target range, obtains a target movement corresponding to the height of the jump obstacle according to the correspondence between the plurality of heights and the movement distances, and controls the first virtual object to move by the target movement distance in a direction away from the jump obstacle. For example, when the height of the jump obstacle is 10 meters, the first virtual object retreats by 3 meters correspondingly; and when the height of the jump obstacle is 15 meters, the first virtual object retreats by 5 meters correspondingly.

Figure 6:
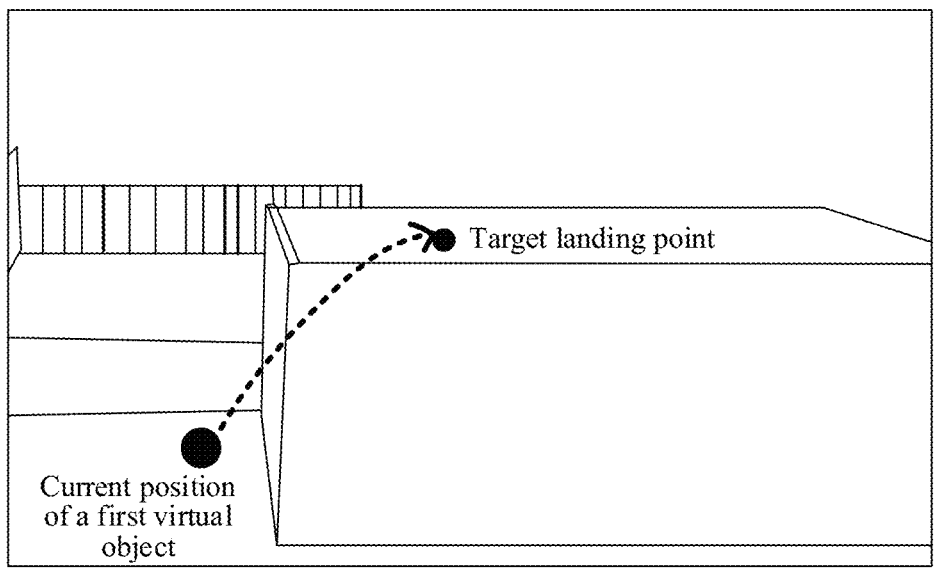
FIG. 6 is a schematic diagram of a jump obstacle according to an embodiment of this application.
Figure 7:
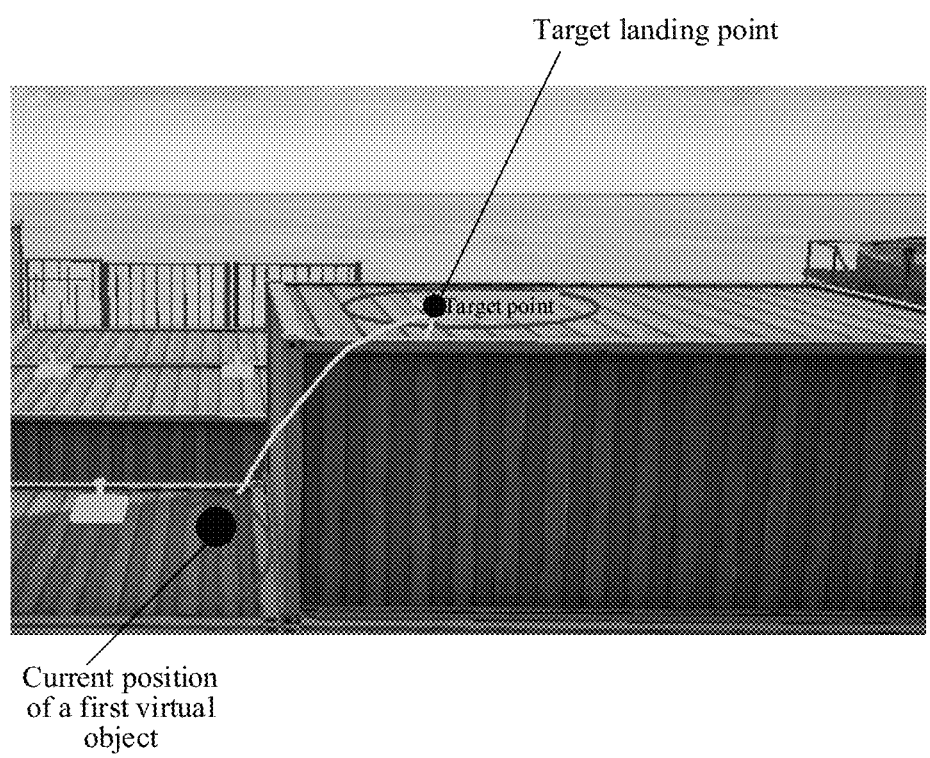
FIG. 7 is a schematic diagram of an interface of a jump obstacle according to an embodiment of this application.

As shown in FIG. 6, when there is a relatively high container in front of the first virtual object, it may be learned based on a predicted possible jump trajectory that, the first virtual object may encounter the container in the air after jumping and before reaching the target landing point, and the container is the jump obstacle of the first virtual object. The computer device may control the first virtual object to retreat by a specific distance and then jump. As shown in FIG. 7, FIG. 7 is a schematic diagram of an actual scene interface of the virtual scene shown in FIG. 6, and an actual form of the virtual scene may be understood more clearly from FIG. 7.

305. The computer device determines, according to the current position and the target landing point, a jump trajectory of the first virtual object jumping from the current position to the target landing point.

In the embodiments of this application, the computer device may first determine a jump speed of jumping from the current position to the target landing point, and then determine the jump trajectory based on the jump speed. This step may include: the computer device may determine a jump speed of the first virtual object at the current position according to the current position and the target landing point, and the computer device determines the jump trajectory of the first virtual object from the current position to the target landing point according to the jump speed. The jump speed includes a speed value and a speed direction of the jump speed.

In one embodiment, the jump trajectory may be a parabolic trajectory, and the computer device may determine the jump speed of the first virtual object by using the following Formula 1 according to the current position and the target landing point:

$$\begin{cases} x = v_0 t \cos(\theta) \\ y = v_0 t \sin(\theta) - \frac{1}{2} g t^2 \end{cases}, \quad \text{Formula 1}$$

where x is used for representing a horizontal displacement from the current position to the target landing point, y is used for representing a vertical displacement perpendicular to a horizontal plane from the current position to the target landing point, $v_0$ is used for representing the speed value of the jump speed, $\theta$ is used for representing the speed direction of the jump speed, and g represents the gravitational acceleration.

In the embodiments of this application, $\theta$ may be an angle between the speed direction and the horizontal plane, $\theta$ is shown in Formula 2:

$$\theta = \arctan\left(\frac{v^2 \pm \sqrt{v^4 - g(gx^2 + 2yv^2)}}{gx}\right). \quad \text{Formula 2}$$

The computer device may obtain a speed range of the first virtual object, and obtain, based on a plurality of speed values included in the speed range, a speed value and a speed direction that meet Formula 1. For example, the computer device may substitute, starting from a minimum value venin of speed values in the speed range, the speed values into Formula 1, to determine whether Formula 1 is met. If the formula is not met, the minimum value is increased by a target threshold to $v_{min}+\Delta v$ and substitute the value into Formula 1 until a jump speed meeting Formula 1 is obtained.

Figure 8:
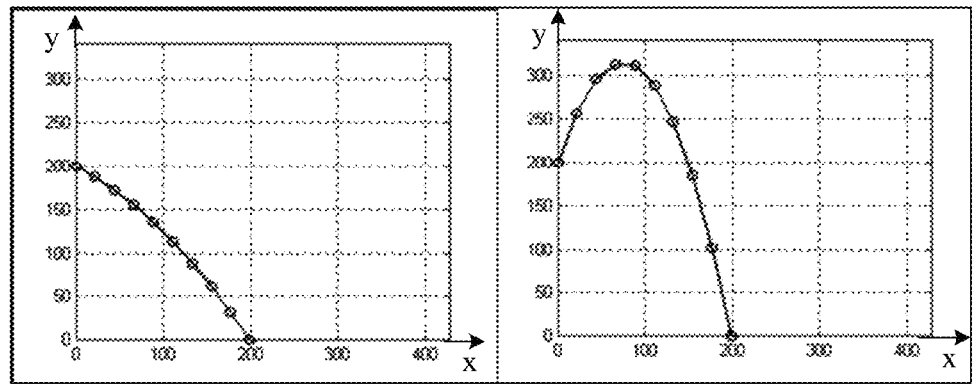
FIG. 8 is a schematic diagram of jump trajectories according to an embodiment of this application.

In one embodiment, as shown in FIG. 8, the computer device determines two jump trajectories based on Formula 1, where a left figure in FIG. 8 is a first jump trajectory corresponding to jumping downward directly, and a right figure in FIG. 8 is a second jump trajectory corresponding to jumping upward first and then landing. In FIG. 8, in the two coordinate systems, a horizontal coordinate is a distance in a horizontal direction, and a vertical coordinate is a distance in a vertical direction. The current position is (0, 200), the target landing point is (200, 0), and a unit may be meter. The computer device may select the second jump trajectory corresponding to jumping upward first and then landing. In another embodiment, the computer device may alternatively determine the jump trajectory based on a relative height between the current position and the target landing point. When the height of the current position is higher than that of the target landing point, the computer device may also select the first jump trajectory corresponding to jumping downward directly; and when the height of the current position is lower than that of the target landing point, the computer device may select the second jump trajectory corresponding to jumping upward first and then landing.

If the first virtual object is an AI object, the computer device may implement the process of steps 302 to 305 by using a method of adding nodes to an action tree of the AI object, to control a jump process of the virtual object. In one embodiment, the computer device may configure the detection logic of step 302 in a first node, configure the jump logic of steps 303 to 305 in a second node, and add the first node and the second node to the action tree, to implement a jump control process of the virtual object. When the action tree of the AI object is modified, original AI logic such as underlying pathfinding and attack logic of the AI object does not need to be modified, and nodes in the action tree can be added or deleted at any time, so that the method of the embodiments of this application may be implemented more conveniently. In addition, there is no need to configure a lot of link bridges in the navigation mesh, thereby improving the applicability of the object jump control method.

306. The computer device controls the first virtual object to jump from the current position to the target landing point according to the jump trajectory.

The computer device may insert and display a plurality of intermediate images corresponding to the jump process between the first image and a second image according to the jump trajectory. In this step, the computer device may obtain, according to the jump trajectory, a plurality of aerial positions of the first virtual object after leaving the current position and before reaching the target landing point. The computer device obtains a plurality of intermediate images of the first virtual object based on the plurality of aerial positions, each intermediate image being used for displaying the first virtual object located at an aerial position. The computer device plays the plurality of intermediate images based on a play sequence of the plurality of intermediate images.

If the computer device is a terminal, a process that the first virtual object jumps from the current position to the target landing point is displayed based on the foregoing steps. If the computer device is a server, the computer device may obtain the plurality of aerial positions, and transmit the plurality of aerial positions to a terminal. The terminal obtains a plurality of intermediate images and plays the plurality of intermediate images based on a play sequence of the plurality of intermediate images.

In one embodiment, starting from a jump start time corresponding to the current position, the computer device may obtain, according to the jump trajectory, one intermediate position of the first virtual object at intervals of a target time period, and stop obtaining until a jump end time corresponding to the target landing point is reached, to obtain a plurality of intermediate positions. The computer device renders and displays, according to object display data of the first virtual object and each intermediate position, the first virtual object located at a corresponding intermediate position in each intermediate image.

In one embodiment, the destination is the current position of the target virtual object, the first virtual object may be an AI object, and the target virtual object may be a virtual user object. When the computer device controls the first virtual object to jump to the target landing point, the computer device may further display a process that the AI object attacks the target virtual object based on pathfinding and attack logic of the AI object.

Figure 9:
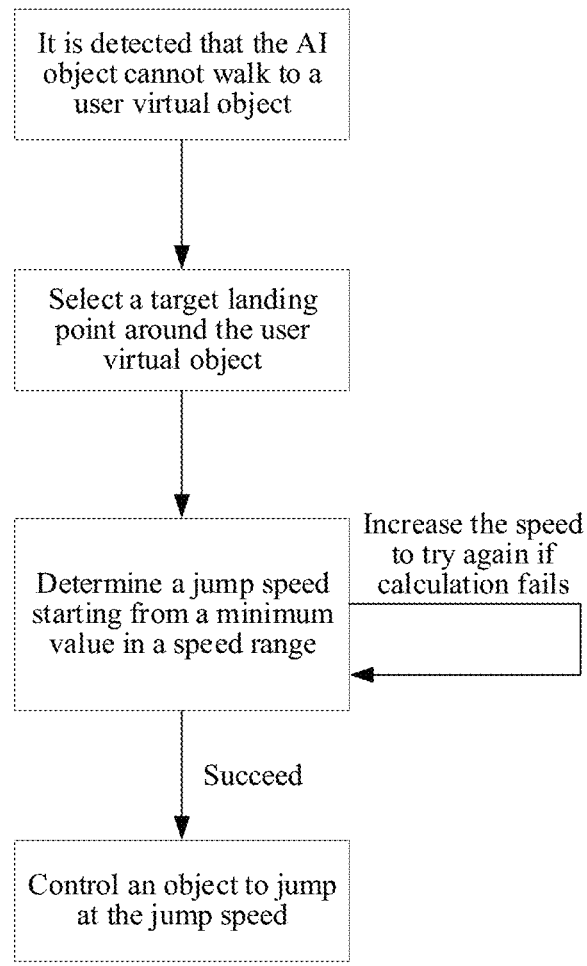
FIG. 9 is a flowchart of object jump control according to an embodiment of this application.

To describe the process of the embodiments of this application more clearly, the foregoing steps 301 to 306 are described below by using the flowchart shown in FIG. 9. An AI object is used as an example. When the computer device detects that the AI object cannot walk to a virtual user object, a target landing point around the virtual user object is selected, for example, a point located in a walking region of the virtual user object. The computer device starts calculation, based on a speed range of the AI object and Formula 1 in step 305, by substituting a minimum value in the speed range into Formula 1. If the calculation fails, the minimum value is increased and then substituted into Formula 1 for calculation again until a jump speed meeting Formula 1 is determined. The computer device controls the first virtual object to jump to the target landing point at the jump speed to attack the virtual user object.

In the embodiments of this application, the computer device may obtain the target landing point based on the position of the destination, determine the jump trajectory and control the first virtual object to jump from the current position to the target landing point without jumping according to pre-configured jump points. Therefore, a process of configuring a lot of link bridges in non-walkable regions is omitted, costs of object jump control are reduced, and resource utilization is improved.

It is to be understood that the steps in the embodiments of this application are not necessarily performed according to a sequence indicated by step numbers. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of another step.

Figure 10:
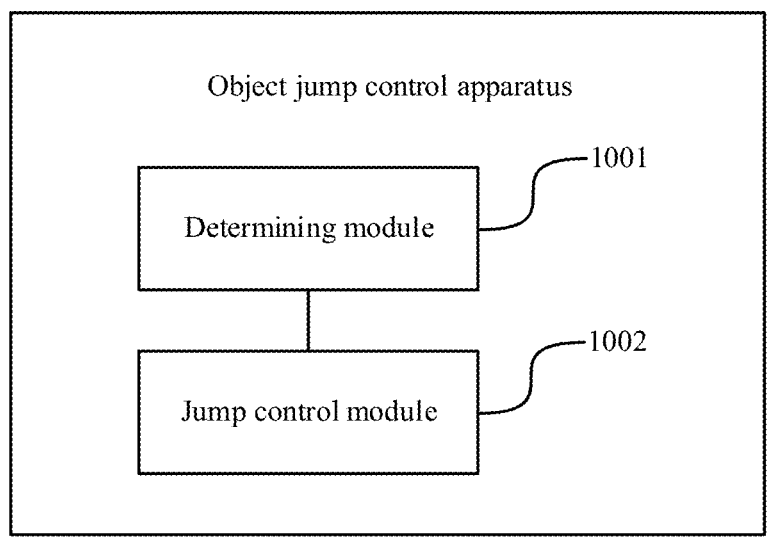
FIG. 10 is a schematic structural diagram of an object jump control apparatus according to an embodiment of this application.

FIG. 10 is a schematic structural diagram of an object jump control apparatus according to an embodiment of this application. Referring to FIG. 10, the apparatus includes: a determining module 1001, configured to determine, in a process that a first virtual object in a virtual scene moves to a destination, a target landing point of the first virtual object according to a position of the destination when a current position of the first virtual object meets a jump condition; the determining module 1001 being further configured to determine, according to the current position and the target landing point, a jump trajectory of the first virtual object jumping from the current position to the target landing point; and a jump control module 1002, configured to control the first virtual object to jump from the current position to the target landing point according to the jump trajectory.

In one embodiment, the determining module 1001 is further configured to perform any one of the following: determining, based on a walking region of the destination, a target landing point located in the walking region when the current position meets the jump condition, a walking path existing between any position in the walking region and the destination; determining a position that is closest to the destination in the virtual scene as the target landing point when the current position meets the jump condition; determining an adjacent position of the destination in the virtual scene as the target landing point when the current position meets the jump condition; or determining the destination as the target landing point when the current position meets the jump condition.

In one embodiment, the determining module 1001 is further configured to perform any one of the following: obtaining, according to a maximum jump speed of the first virtual object, a target landing point corresponding to the maximum jump speed in the walking region; or obtaining a selected position in the walking region, and determining the selected position as the target landing point.

In one embodiment, the destination refers to a current position of a target virtual object in the virtual scene, or a selected position in the virtual scene.

In one embodiment, the jump condition includes: there is no walking path between the current position and the destination, or there is an obstacle in front of the current position in a direction of a shortest path between the current position and the destination.

In one embodiment, the determining module 1001 is further configured to determine a jump speed of the first virtual object at the current position according to the current position and the target landing point; and determine the jump trajectory of the first virtual object from the current position to the target landing point according to the jump speed.

In one embodiment, the apparatus further includes: an obtaining module, configured to move the first virtual object when there is a jump obstacle between the current position and the destination, and obtain a current position of the first virtual object after the movement, a distance between the first virtual object after the movement and the target landing point being greater than a distance between the first virtual object before the movement and the target landing point.

In one embodiment, the jump control module 1002 is further configured to obtain, according to the jump trajectory, a plurality of aerial positions of the first virtual object after leaving the current position and before reaching the target landing point; obtain a plurality of intermediate images of the first virtual object based on the plurality of aerial positions, each intermediate image being used for displaying the first virtual object located at an aerial position; and play the plurality of intermediate images based on a play sequence of the plurality of intermediate images.

In the embodiments of this application, the computer device may obtain the target landing point based on the position of the destination, determine the jump trajectory and control the first virtual object to jump from the current position to the target landing point without jumping according to pre-configured jump points. Therefore, a process of configuring a lot of link bridges in non-walkable regions is omitted, costs of object jump control are reduced, and resource utilization is improved.

Any combination of the foregoing technical solutions may be used to form an embodiment of the present disclosure. Details are not described herein again.

When an object is controlled to jump by using the object jump control apparatus provided in the foregoing embodiments, description is made with an example of division of the foregoing functional modules. During actual application, the functions may be allocated to and completed by different functional modules according to requirements, that is, the internal structure of the computer device is divided into different functional modules, to implement all or some of the functions described above. In addition, the object jump control apparatus provided in the foregoing embodiment belongs to the same conception as the embodiment of the object jump control method. For the specific implementation process, reference may be made to the method embodiments, and details are not described herein again.

Figure 11:
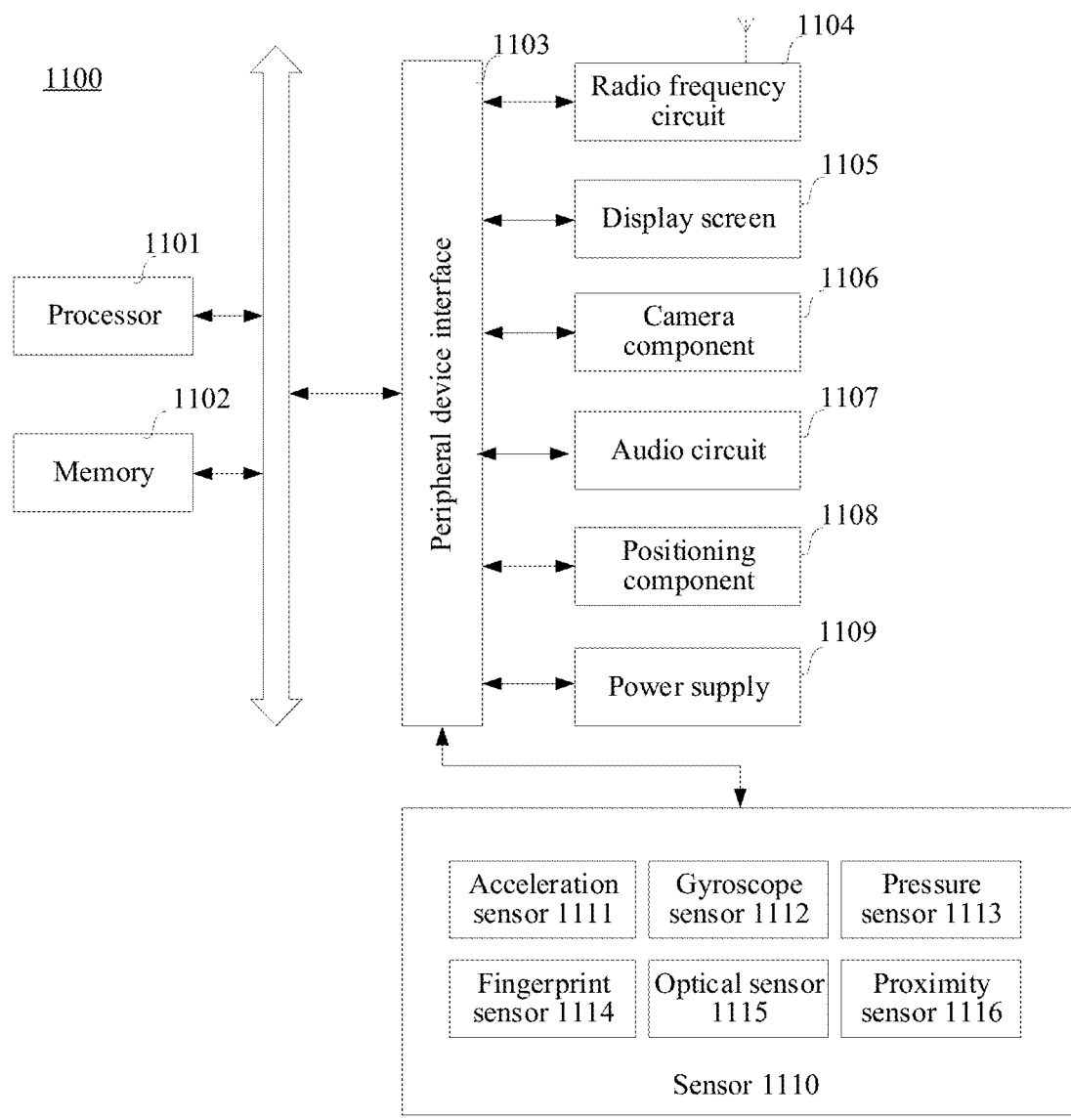
FIG. 11 is a schematic structural diagram of a terminal according to an embodiment of this application.

FIG. 11 is a schematic structural diagram of a terminal according to an embodiment of this application. The terminal 1100 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1100 may also be referred to as another name such as user equipment, a portable terminal, a laptop terminal, or a desktop terminal.

Generally, the terminal 1100 includes a processor 1101 and a memory 1102.

The processor 1101 may include one or more processing cores, for example, a 4-core processor or an 8-core processor. The processor 1101 may be implemented in at least one hardware form of a digital signal processor (DSP), a field-programmable gate array (FPGA), and a programmable logic array (PLA). The processor 1101 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1101 may be integrated with a graphics processing unit (GPU). The GPU is configured to render and draw content that needs to be displayed on a display screen. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some embodiments, a non-transitory computer-readable storage medium in the memory 1102 is configured to store at least one instruction, the at least one instruction being configured to be executed by the processor 1101 to implement the object jump control method provided in the method embodiments of this application.

In some embodiments, the terminal 1100 may include: a peripheral device interface 1103 and at least one peripheral device. The processor 1101, the memory 1102, and the peripheral device interface 1103 may be connected by using a bus or a signal cable. Each peripheral device may be connected to the peripheral device interface 1103 by using a bus, a signal cable, or a circuit board. Specifically, the peripheral device includes: at least one of a radio frequency (RF) circuit 1104, a display screen 1105, a camera component 1106, an audio circuit 1107, a positioning component 1108, and a power supply 1109.

The peripheral device interface 1103 may be configured to connect the at least one peripheral related to input/output (I/O) to the processor 1101 and the memory 1102. In some embodiments, the processor 1101, the memory 1102 and the peripheral device interface 1103 are integrated on the same chip or circuit board. In some other embodiments, any one or two of the processor 1101, the memory 1102, and the peripheral device interface 1103 may be implemented on a single chip or circuit board. This is not limited in this embodiment.

The RF circuit 1104 is configured to receive and transmit an RF signal, also referred to as an electromagnetic signal. The RF circuit 1104 communicates with a communication network and other communication devices through the electromagnetic signal. The RF circuit 1104 converts an electrical signal into an electromagnetic signal for transmission, or converts a received electromagnetic signal into an electrical signal. In some embodiments, the RF circuit 1104 includes: an antenna system, an RF transceiver, one or more amplifiers, a tuner, an oscillator, a digital signal processor, a codec chip set, a subscriber identity module card, and the like. The RF circuit 1104 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF 1104 may further include a circuit related to NFC, which is not limited in this application.

The display screen 1105 is configured to display a user interface (UI). The UI may include a graph, text, an icon, a video, and any combination thereof. When the display screen 1105 is a touch display screen, the display screen 1105 is further capable of collecting touch signals on or above a surface of the display screen 1105. The touch signal may be inputted to the processor 1101 as a control signal for processing. In this case, the display screen 1105 may be further configured to provide a virtual button and/or a virtual keyboard, which is also referred to as a soft button and/or a soft keyboard. In some embodiments, there may be one display screen 1105, disposed on a front panel of the terminal 1100. In some other embodiments, there may be at least two display screens 1105, respectively disposed on different surfaces of the terminal 1100 or designed in a foldable shape. In still some other embodiments, the display screen 1105 may be a flexible display screen, disposed on a curved surface or a folded surface of the terminal 1100. Even, the display screen 1105 may be further set in a non-rectangular irregular pattern, namely, a special-shaped screen. The display screen 1105 may be prepared by using materials such as a liquid crystal display (LCD), an organic light-emitting diode (OLED), or the like.

The camera component 1106 is configured to collect images or videos. In some embodiments, the camera component 1106 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1106 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1107 may include a microphone and a speaker. The microphone is configured to collect sound waves of a user and an environment, and convert the sound waves into an electrical signal to input to the processor 1101 for processing, or input to the RF circuit 1104 for implementing voice communication. For the purpose of stereo sound acquisition or noise reduction, there may be a plurality of microphones, respectively disposed at different parts of the terminal 1100. The microphone may further be an array microphone or an omni-directional collection type microphone. The speaker is configured to convert electrical signals from the processor 1101 or the RF circuit 1104 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1107 may also include an earphone jack.

The positioning component 1108 is configured to determine a current geographic location of the terminal 1100, to implement a navigation or a location based service (LBS). The positioning component 1108 may be a positioning component based on the Global Positioning System (GPS) of the United States, the BeiDou system of China, the GLONASS System of Russia, or the GALILEO System of the European Union.

The power supply 1109 is configured to supply power to components in the terminal 1100. The power supply 1109 may be an alternating-current power supply, a direct-current power supply, a disposable battery, or a rechargeable battery. When the power supply 1109 includes the rechargeable battery, the rechargeable battery may support wired charging or wireless charging. The rechargeable battery may be further configured to support a fast charging technology.

In some embodiments, the terminal 1100 further includes one or more sensors 1110. The one or more sensors 1110 include, but are not limited to: an acceleration sensor 1111, a gyroscope sensor 1112, a pressure sensor 1113, a fingerprint sensor 1114, an optical sensor 1115, and a proximity sensor 1116.

The acceleration sensor 1111 may detect acceleration on three coordinate axes of a coordinate system established by the terminal 1100. For example, the acceleration sensor 1111 may be configured to detect components of gravity acceleration on the three coordinate axes. The processor 1101 may control, according to a gravity acceleration signal acquired by the acceleration sensor 1111, the touch display screen 1105 to display the UI in a landscape view or a portrait view. The acceleration sensor 1111 may be further configured to acquire motion data of a game or a user.

The gyroscope sensor 1112 may detect a body direction and a rotation angle of the terminal 1100. The gyroscope sensor 1112 may cooperate with the acceleration sensor 1111 to collect a 3D action by the user on the terminal 1100. The processor 1101 may implement the following functions according to data acquired by the gyroscope sensor 1112: motion sensing (for example, the UI is changed according to a tilt operation of a user), image stabilization during shooting, game control, and inertial navigation.

The pressure sensor 1113 may be disposed at a side frame of the terminal 1100 and/or a lower layer of the touch display screen 1105. When the pressure sensor 1113 is disposed at the side frame of the terminal 1100, a holding signal of the user on the terminal 1100 may be detected. The processor 1101 performs left and right hand recognition or a quick operation according to the holding signal collected by the pressure sensor 1113. When the pressure sensor 1113 is disposed at the low layer of the touch display screen 1105, the processor 1101 controls, according to a pressure operation of the user on the touch display screen 1105, an operable control on the UI. The operable control includes at least one of a button control, a scroll-bar control, an icon control, and a menu control.

The fingerprint sensor 1114 is configured to collect a user's fingerprint, and the processor 1101 identifies a user's identity according to the fingerprint collected by the fingerprint sensor 1114, or the fingerprint sensor 1114 identifies a user's identity according to the collected fingerprint. When identifying that the user's identity is a trusted identity, the processor 1101 authorizes the user to perform related sensitive operations. The sensitive operations include: unlocking a screen, viewing encrypted information, downloading software, paying, changing a setting, and the like. The fingerprint sensor 1114 may be disposed on a front surface, a back surface, or a side surface of the terminal 1100. When a physical button or a vendor logo is disposed on the terminal 1100, the fingerprint 1114 may be integrated with the physical button or the vendor logo.

The optical sensor 1115 is configured to collect ambient light intensity. In an embodiment, the processor 1101 may control the display brightness of the touch display screen 1105 according to the ambient light intensity collected by the optical sensor 1115. Specifically, when the ambient light intensity is relatively high, the display brightness of the touch display screen 1105 is increased. When the ambient light intensity is relatively low, the display brightness of the touch display screen 1105 is decreased. In another embodiment, the processor 1101 may further dynamically adjust a camera parameter of the camera component 1106 according to the ambient light intensity collected by the optical sensor 1115.

The proximity sensor 1116, also referred to as a distance sensor, is usually disposed on the front panel of the terminal 1100. The proximity sensor 1116 is configured to collect a distance between the user and the front face of the terminal 1100. In an embodiment, when the proximity sensor 1116 detects that a distance between the user and the front face of the terminal 1100 gradually becomes smaller, the touch display screen 1105 is controlled by the processor 1101 to switch from a screen-on state to a screen-off state. When the proximity sensor 1116 detects that the distance between the user and the front face of the terminal 1100 gradually becomes larger, the touch display screen 1105 is controlled by the processor 1101 to switch from the screen-off state to the screen-on state.

A person skilled in the art may understand that a structure shown in FIG. 11 constitutes no limitation on the terminal 1100, and the terminal may include more or fewer components than those shown in the figure, or some components may be combined, or a different component deployment may be used.

Figure 12:
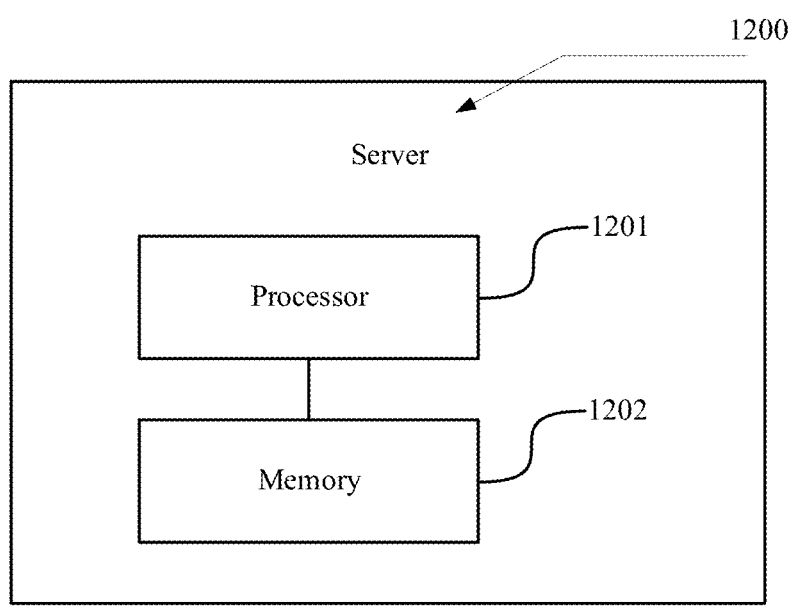
FIG. 12 is a schematic structural diagram of a server according to an embodiment of this application.

FIG. 12 is a schematic structural diagram of a server according to an embodiment of this application. The server 1200 may vary greatly due to different configurations or performance, and may include one or more central processing units (CPUs) 1201 and one or more memories 1202. The memory 1202 stores at least one instruction, the at least one instruction being loaded and executed by the processor 1201 to implement the object jump control method provided in the foregoing method embodiments. Certainly, the server may further have a wired or wireless network interface, a keyboard, an I/O interface and other components to facilitate I/O. The server may further include other components for implementing device functions. Details are not described herein again.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an exemplary embodiment, a computer-readable storage medium is further provided, for example, a memory including instructions. The instructions may be executed by a processor in the computer device to complete the object jump control method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the foregoing embodiments may be implemented by hardware, or may be implemented by a program instructing related hardware. The program may be stored in a computer-readable storage medium. The storage medium mentioned above may be: a ROM, a magnetic disk, or an optical disc.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A virtual object jump control method, performed by a computer device, comprising:
   determining, in a process that a first virtual object in a virtual scene moves to a destination, a target landing point of the first virtual object according to a position of the destination when a current position of the first virtual object meets a jump condition, wherein the first virtual object is a non-user-controlled object or a user-associated object configured to move automatically according to the destination;
   determining, according to the current position and the target landing point, a jump trajectory of the first virtual object jumping from the current position to the target landing point; and
   controlling the first virtual object to jump from the current position to the target landing point according to the jump trajectory, wherein the method further comprises:
  determining whether the current position of the first virtual object meets the jump condition periodically, including:
    determining whether a walking path exists between the first virtual object and a user-controlled object;
    setting the first virtual object to a within-reach state in response to determining that the walking path exists; and
    setting the first virtual object to an out-of-reach state in response to determining that the walking path does not exist; and
  executing the step of determining the target landing point of the first virtual object in response to detecting the out-of-reach state of the first virtual object.

2. The method according to claim 1, wherein the determining a target landing point of the first virtual object according to a position of the destination when a current position of the first virtual object meets a jump condition comprises any one of the following:
  determining, based on a walking region of the destination, a target landing point located in the walking region when the current position meets the jump condition, a walking path existing between any position in the walking region and the destination;
  determining a position that is closest to the destination in the virtual scene as the target landing point when the current position meets the jump condition;
  determining an adjacent position of the destination in the virtual scene as the target landing point when the current position meets the jump condition; or
  determining the destination as the target landing point when the current position meets the jump condition.

3. The method according to claim 2, wherein the determining, based on a walking region of the destination, a target landing point located in the walking region comprises any one of the following:
  obtaining, according to a maximum jump speed of the first virtual object, a target landing point corresponding to the maximum jump speed in the walking region; or
  obtaining a selected position in the walking region, and determining the selected position as the target landing point.

4. The method according to claim 1, wherein the destination refers to a current position of a target virtual object in the virtual scene, or a selected position in the virtual scene.

5. The method according to claim 1, wherein the jump condition comprises: there being no walking path between the current position and the destination, or there being an obstacle in front of the current position in a direction of a shortest path between the current position and the destination.

6. The method according to claim 1, wherein the determining, according to the current position and the target landing point, a jump trajectory of the first virtual object jumping from the current position to the target landing point comprises:
  determining a jump speed of the first virtual object at the current position according to the current position and the target landing point; and
  determining the jump trajectory of the first virtual object from the current position to the target landing point according to the jump speed.

7. The method according to claim 1, wherein before the determining, according to the current position and the target landing point, a jump trajectory of the first virtual object jumping from the current position to the target landing point, the method further comprises:
  moving the first virtual object when there is a jump obstacle between the current position and the destination, and obtaining a current position of the first virtual object after the movement, a distance between the first virtual object after the movement and the target landing point being greater than a distance between the first virtual object before the movement and the target landing point.

8. The method according to claim 1, wherein the controlling the first virtual object to jump from the current position to the target landing point according to the jump trajectory comprises:
  obtaining, according to the jump trajectory, a plurality of aerial positions of the first virtual object after leaving the current position and before reaching the target landing point;
  obtaining a plurality of intermediate images of the first virtual object based on the plurality of aerial positions, each intermediate image being used for displaying the first virtual object located at an aerial position; and
  playing the plurality of intermediate images based on a play sequence of the plurality of intermediate images.

9. A computer device, comprising a memory and a processor, the memory storing computer-readable instructions, the computer-readable instructions, when executed by the processor, causing the processor to perform operations comprising:
  determining, in a process that a first virtual object in a virtual scene moves to a destination, a target landing point of the first virtual object according to a position of the destination when a current position of the first virtual object meets a jump condition, wherein the first virtual object is a user-associated object configured to move automatically according to the destination;
  determining, according to the current position and the target landing point, a jump trajectory of the first virtual object jumping from the current position to the target landing point; and
  controlling the first virtual object to jump from the current position to the target landing point according to the jump trajectory,
wherein the operations further comprise:
  determining whether the current position of the first virtual object meets the jump condition periodically, including:
    determining whether a walking path exists between the first virtual object and a user-controlled object;
    setting the first virtual object to a within-reach state in response to determining that the walking path exists; and
    setting the first virtual object to an out-of-reach state in response to determining that the walking path does not exist; and
  executing the step of determining the target landing point of the first virtual object in response to detecting the out-of-reach state of the first virtual object.

10. The computer device according to claim 9, wherein the determining a target landing point of the first virtual object according to a position of the destination when a current position of the first virtual object meets a jump condition comprises any one of the following:
  determining, based on a walking region of the destination, a target landing point located in the walking region when the current position meets the jump condition, a walking path existing between any position in the walking region and the destination;

determining a position that is closest to the destination in the virtual scene as the target landing point when the current position meets the jump condition;

determining an adjacent position of the destination in the virtual scene as the target landing point when the current position meets the jump condition; or determining the destination as the target landing point when the current position meets the jump condition.

11. The computer device according to claim 10, wherein the determining, based on a walking region of the destination, a target landing point located in the walking region comprises any one of the following:

obtaining, according to a maximum jump speed of the first virtual object, a target landing point corresponding to the maximum jump speed in the walking region; or obtaining a selected position in the walking region, and determining the selected position as the target landing point.

12. The computer device according to claim 9, wherein the destination refers to a current position of a target virtual object in the virtual scene, or a selected position in the virtual scene.

13. A non-transitory computer readable storage media storing computer-readable instructions, the computer-readable instructions, when executed by one or more processors, causing the one or more processors to perform operations comprising:

determining, in a process that a first virtual object in a virtual scene moves to a destination, a target landing point of the first virtual object according to a position of the destination when a current position of the first virtual object meets a jump condition, wherein the first virtual object is a non-user-controlled object configured to move automatically according to the destination;

determining, according to the current position and the target landing point, a jump trajectory of the first virtual object jumping from the current position to the target landing point; and controlling the first virtual object to jump from the current position to the target landing point according to the jump trajectory, wherein the operations further comprise:

determining whether the current position of the first virtual object meets the jump condition periodically, including:

determining whether a walking path exists between the first virtual object and a user-controlled object;

setting the first virtual object to a within-reach state in response to determining that the walking path exists; and setting the first virtual object to an out-of-reach state in response to determining that the walking path does not exist, and executing the step of determining the target landing point of the first virtual object in response to detecting the out-of-reach state of the first virtual object.

14. The computer readable storage media according to claim 13, wherein the determining a target landing point of the first virtual object according to a position of the destination when a current position of the first virtual object meets a jump condition comprises any one of the following:

determining, based on a walking region of the destination, a target landing point located in the walking region when the current position meets the jump condition, a walking path existing between any position in the walking region and the destination;

determining a position that is closest to the destination in the virtual scene as the target landing point when the current position meets the jump condition;

determining an adjacent position of the destination in the virtual scene as the target landing point when the current position meets the jump condition; or determining the destination as the target landing point when the current position meets the jump condition.

15. The computer readable storage media according to claim 14, wherein the determining, based on a walking region of the destination, a target landing point located in the walking region comprises any one of the following:

obtaining, according to a maximum jump speed of the first virtual object, a target landing point corresponding to the maximum jump speed in the walking region; or obtaining a selected position in the walking region, and determining the selected position as the target landing point.

16. The computer readable storage media according to claim 13, wherein the destination refers to a current position of a target virtual object in the virtual scene, or a selected position in the virtual scene.

17. The computer readable storage media according to claim 13, wherein the jump condition comprises: there being no walking path between the current position and the destination, or there being an obstacle in front of the current position in a direction of a shortest path between the current position and the destination.

18. The computer readable storage media according to claim 13, further comprising:

after controlling the first virtual object to jump to the target landing point, controlling the first virtual object to move according to a position of a user-controlled object.

19. The computer readable storage media according to claim 13, wherein the target landing point is located in a region where a walking path to the destination exists.

* * * * *